United States Patent [19]
Cudak et al.

[11] Patent Number: 6,091,757
[45] Date of Patent: Jul. 18, 2000

[54] DATA TRANSMISSION WITHIN A SPREAD-SPECTRUM COMMUNICATION SYSTEM

[75] Inventors: Mark C. Cudak, McHenry; Amitava Ghosh, Vernon Hills, both of Ill.

[73] Assignee: Motorola, Inc., Schaumburg, Ill.

[21] Appl. No.: 09/229,478

[22] Filed: Jan. 13, 1999

Related U.S. Application Data

[63] Continuation-in-part of application No. 09/204,702, Dec. 3, 1998.

[51] Int. Cl.[7] .................................................. H04B 15/00
[52] U.S. Cl. .......................... 375/130; 370/508; 370/519
[58] Field of Search .................................. 375/130, 144, 375/148; 370/508, 519, 537, 345

[56] References Cited

U.S. PATENT DOCUMENTS

| | | | |
|---|---|---|---|
| 4,827,474 | 5/1989 | Le Goffic et al. ...................... | 370/104 |
| 5,317,571 | 5/1994 | Marcel et al. .......................... | 370/103 |
| 5,668,804 | 9/1997 | Suonvieri ................................ | 370/331 |
| 5,898,697 | 4/1999 | Hurme et al. .......................... | 370/508 |

*Primary Examiner*—Stephen Chin
*Assistant Examiner*—Mohammad Bhayour
*Attorney, Agent, or Firm*—Kenneth A. Haas

[57] ABSTRACT

Remote units (113) having large amounts of data to transmit will be dynamically assigned Orthogonal Variable Spreading Factor (OVSF) codes corresponding to higher data rates and remote units (113) with lower amounts of data to be transmitted will be assigned OVSF codes corresponding to lower data rates. The reduction of the data rate between the base station (100) and remote units (113) occurs by changing the current OVSF codes utilized by both the remote units (113) and the base station (100). In order to eliminate collisions among remote units transmitting data, a remote units transmission is advanced and retarded in time based on an amount of offset from a frame boundary.

3 Claims, 8 Drawing Sheets

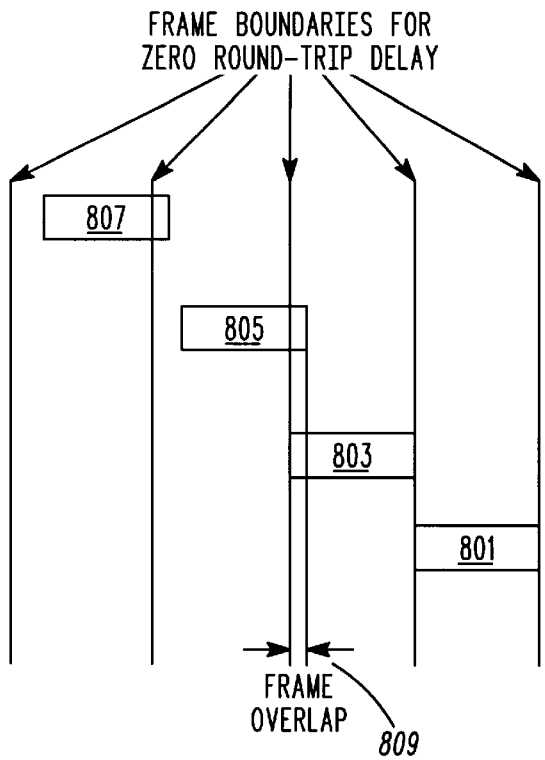
*FIG. 8*
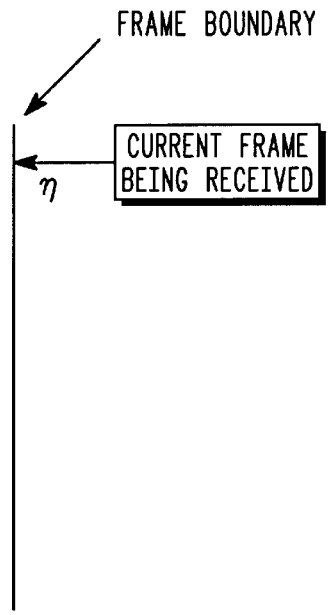
*FIG. 10*
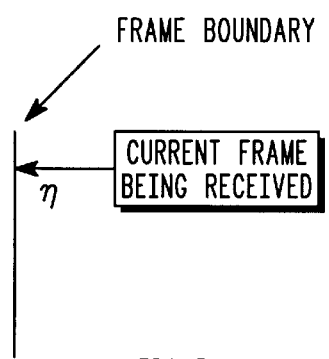
*FIG. 11*
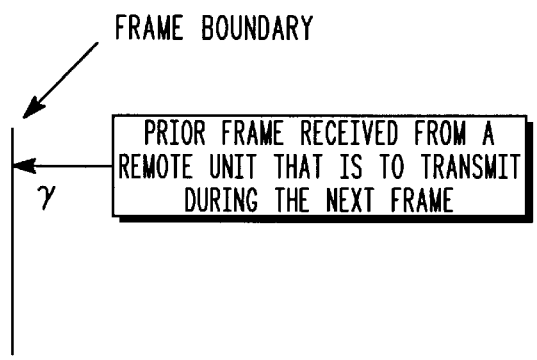

ns a block diagram of a base station for transmitting

DATA TRANSMISSION WITHIN A SPREAD-SPECTRUM COMMUNICATION SYSTEM

This application is CIP of U.S. application Ser. No. 09/204,702 filed on Dec. 3, 1998.

FIELD OF THE INVENTION

The present invention relates generally to cellular communication systems and, in particular, to data transmission within a spread-spectrum communication system.

BACKGROUND OF THE INVENTION

Communication systems are well known and consist of many types including land mobile radio, cellular radiotelephone, personal communication systems, and other communication system types. Within a communication system, transmissions are conducted between a transmitting device and a receiving device over a communication resource, commonly referred to as a communication channel. To date, the transmissions have typically consisted of voice signals. More recently, however, it has been proposed to carry other forms of signals, including high-speed data signals. For ease of operation, it is preferable to have the data transmission capability overlay the existing voice communication capability, such that its operation is essentially transparent to the voice communication system while still utilizing the communication resources and other infrastructure of the voice communication system.

One such communication system currently being developed with transparent data transmission capabilities is the next generation Code-Division Multiple-Access (CDMA) cellular communication system, more commonly referred to as Universal Mobile Telecommunications System (UMTS) Wideband cdma, or cdma2000. Remote unit data transmission within a Wideband communication system takes place by assigning the remote unit a high-speed data channel (referred to as a dedicated data channel) and transmitting data utilizing the dedicated data channel. Typically, as a remote unit moves to a periphery of a serving base site coverage area, the transmit power of the communication unit as well as the transmit power of the base site must be increased to account for an increase in path losses between the serving base site and the remote unit. Even with the increase in transmit power, oftentimes an increase in system interference/noise will prevent data transmission between the remote unit and the base station at higher data rates. More particularly, even though transmissions between the remote unit and the base station occur utilizing high-speed data channels, the retransmission of data due to increased system interference effectively reduces the data rate of the dedicated data channels. The continued high-speed data transmission, and subsequent retransmission, contribute to overall system interference. Additionally, for downlink transmissions there exists a shortage of available channels to utilize in the transmission of data from the base station. The continued transmission and retransmission of data occupies the dedicated data channels for lengthy periods of time. Therefore a need exists for a method and apparatus for data transmission within a communication system that does not occupy dedicated data channels for lengthy periods of time, and does not contribute to overall system interference when an system noise prevents high-speed data transmission.

BRIEF DESCRIPTION OF THE DRAWINGS

FIG. 8 illustrates a timing event diagram showing frames arriving at the base station from multiple remote units of FIG. 7.

FIG. 10–FIG. 11 illustrate determination of a frame offset boundary in accordance with the present invention.

DETAILED DESCRIPTION OF THE DRAWINGS

To address the need for a communication system that does not occupy dedicated data channels for lengthy periods of time, and does not excessively contribute to overall system interference, a method and apparatus for data transmission within a communication system is provided. During operation, remote units having large amounts of data to transmit will be dynamically assigned an Orthogonal Variable Spreading Factor (OVSF) codes corresponding to higher data rates and remote units with lower amounts of data to be transmitted will be assigned OVSF codes corresponding to lower data rates. In order to eliminate collisions among remote units transmitting data, a remote unit transmission is advanced and retarded in time base on an amount of offset from a frame boundary.

Figure 1:
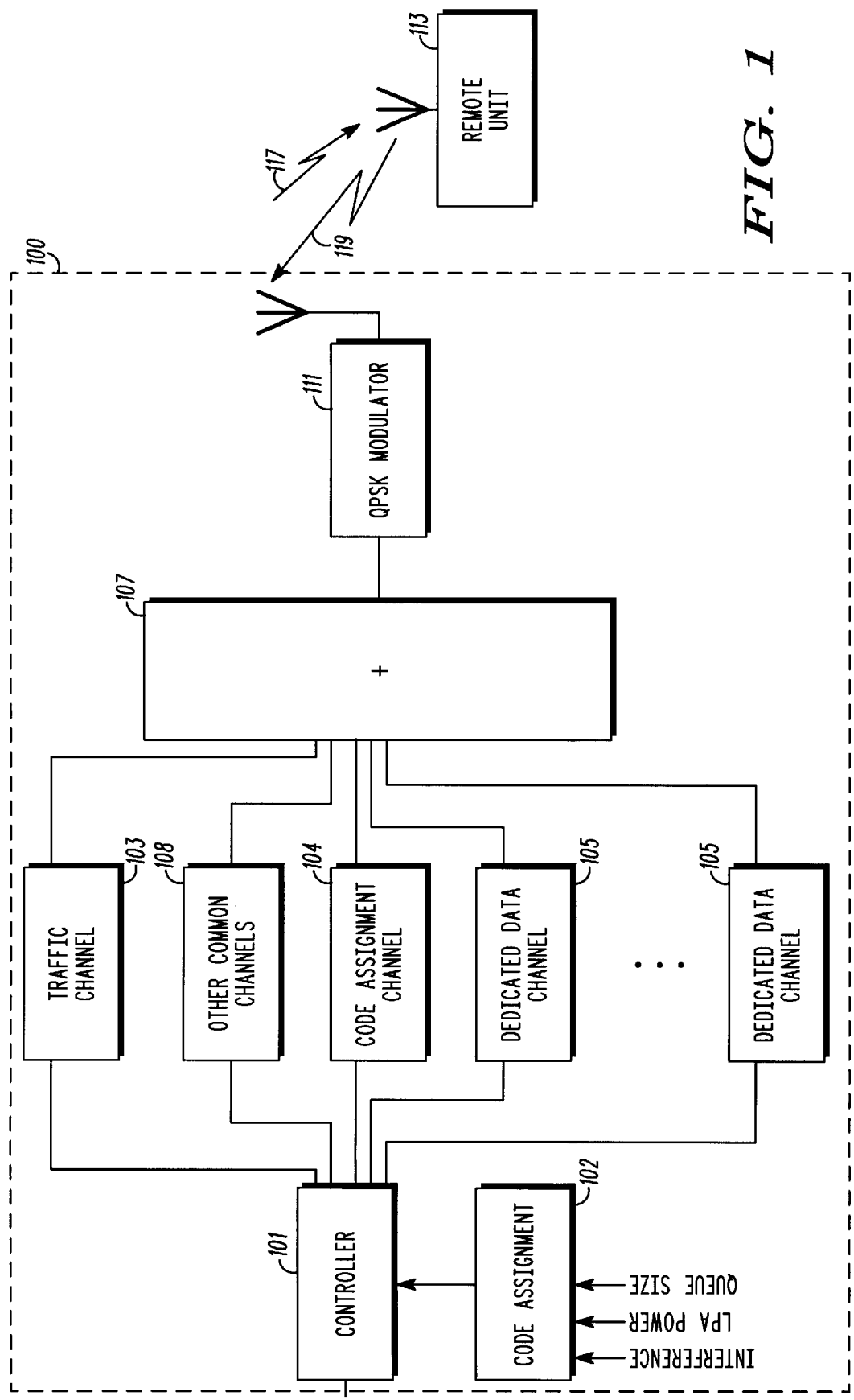
FIG. 1 is a block diagram of a base station for transmitting data in accordance with the preferred embodiment of the present invention.

FIG. 1 is a block diagram of base station 100 for transmitting data to remote unit 113 in accordance with the preferred embodiment of the present invention. In the preferred embodiment of the present invention, base station 100 utilizes a next generation CDMA architecture as described in the UMTS Wideband cdma SMG2 UMTS Physical Layer Expert Group Tdoc SMG2 UMTS-L1 221/98 (UMTS 221/98). However, base station 100 may utilize other system protocols such as the cdma2000 International Telecommunication Union-Radio Communication (ITU-R) Radio Transmission Technology (RTT) Candidate Submission document, the next generation Global System for Mobile Communications (GSM) protocol, or the CDMA system protocol as described in Cellular System Remote unit-Base Station Compatibility Standard of the Electronic Industry Association/Telecommunications Industry Association Interim Standard 95C (IS-95C). Base station 100 comprises base station controller 101, multiple remote units 113 (only one shown), multiple traffic channels 103, one or more dedicated data channels 105, code assignment channel 104, code assignment circuitry 102, summer 107, and modulator 111. In the preferred embodiment of the present invention, all network elements are available from Motorola, Inc. (Motorola Inc. is located at 1301 East Algonquin Road, Schaumburg, Ill. 60196). As shown, base station 100 is communicating to remote unit 113 via downlink communication signal 117, and remote unit 113 is communicating to base station 100 via uplink communication signal 119. It is contemplated that network elements within communication system 100 are configured in well known manners with processors, memories, instruction sets, and the like, which function in any suitable manner to perform the function set forth herein.

In the preferred embodiment, the code assignment channel is used for assigning channelization codes to all remote units in communication with base station 100. In the preferred embodiment of the present invention channelization codes are Orthogonal Variable Spreading Factor (OVSF) codes selected from the hierarchy of such codes described in detail in "Tree Structured Generation of Orthogonal Spreading Codes with different lengths for Forward Link of DS-CDMA Mobile Radio," Electronics Letters, Jan. 2nd, 1997, pp.27–28, by F. Adachi, M. Sawahashi, and K. Okawa.

Traffic channels 103 are similar to existing CDMA traffic channels, and are used for voice and signaling. As described in UMTS 221/98, the transmission rate of this channel may vary dynamically. Additionally, soft handoff (simultaneous communication utilizing more than one traffic channel 103) is supported utilizing traffic channel circuitry 103.

Other common channel 108 includes channels such as a paging channel (PCH), broadcast channel (BCH), forward access channel (FACH), synchronization channel (SCH), as well as other known channels.

As discussed above, dedicated data channels 105 are utilized for communicating high data rate services to remote unit 113. In the preferred embodiment of the present invention the data rate of the dedicated data channels is allowed to vary based on an amount of data to be transmitted, system interference, and amplifier power output.

Data transmission from base station 100 in accordance with the preferred and alternate embodiments of the present invention occurs as follows: During time periods where remote unit 113 is not actively communicating to base station 100 utilizing either a traffic channel, or a dedicated data channel, remote unit 113 is actively or periodically monitoring a forward control channel (UMTS downlink shared control channel) for notification of any pending transmission by base station 100. In particular, downlink shared control channel circuitry (not shown) is utilized to send messages to remote unit 113 indicating pending downlink transmissions. In the preferred embodiment of the present invention, downlink shared control channels circuitry is similar to that described in UMTS 221/98. Base station 100 determines that a high data rate transmission to remote unit 113 needs to take place and determines if dedicated data channel circuitry 105 is available for utilization. Due to the limited number of dedicated data channels available for communication, a dedicated data channel may not be immediately available for transmission to remote unit 113. Once dedicated data channel circuitry 105 becomes available, remote unit 113 is notified of a pending data transmission (via a downlink shared control channel) and assigns remote unit 113 a spreading code (Walsh Code) utilized by dedicated data channel 105. Data transmission then begins utilizing dedicated data channel 105.

As discussed above, during data transmission there may exist a shortage of available OVSF codes. Additionally system interference may effectively reduce the transmission rate between base station 100 and remote unit 113 even though both base station 100 and remote unit 113 continue to transmit at a high data rate. In order to address these problems, in the preferred and alternate embodiments of the present invention code assignment circuitry 102 detects a system load and an overall system interference and notifies base station controller 101 when an OVSF code should be changed. In particular, remote units having large amounts of data to transmit will be dynamically assigned OVSF codes corresponding to higher data rates. Additionally, in the alternate embodiment of the present invention, once system interference becomes greater than a predetermined threshold, the data rate between base station 100 and remote units in communication with base station 100 is reduced. In both embodiments of the present invention the reduction or increase in the data rate between base station 100 and remote unit 113 occurs by changing the current spreading codes (OVSF codes) utilized by both remote unit 113 and base station 100.

Figure 2:
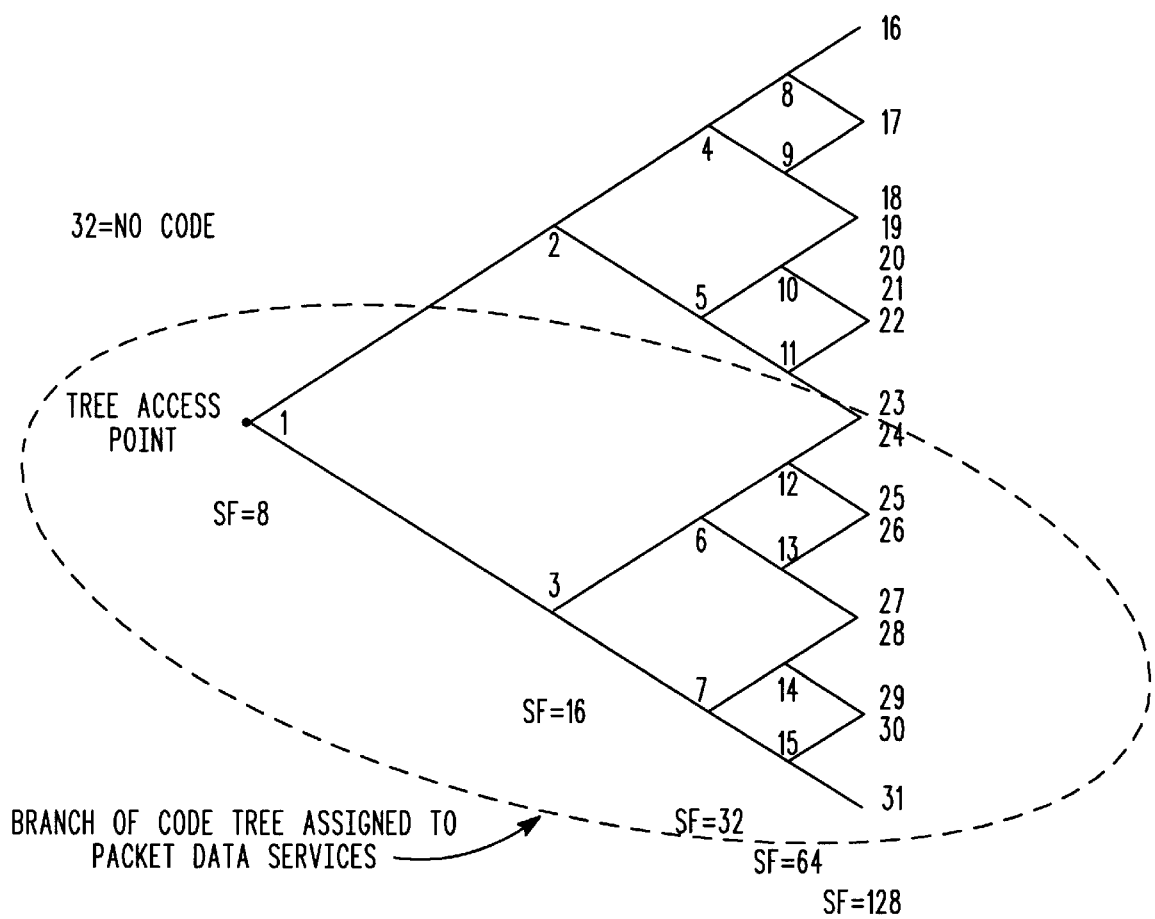
FIG. 2 is an illustration of the assignment of orthogonal variable spreading factor codes in accordance with the preferred embodiment of the present invention.

In both embodiments of the present invention OVSF codes are changed by utilizing a downlink code assignment channel that utilizes a single fixed unique OVSF code known to the remote units in communication with base station 100. Each remote unit 113 in communication with base station 100 is allocated a downlink and uplink dedicated data channel without a permanent OVSF code assignment. Thus the OVSF codes assigned to each remote unit 113 can change on a frame by frame basis. OVSF codes are assigned as described in UMTS 221/98, section 4.3.2. As described in section 4.3.2, and illustrated in FIG. 2, a segment of the code tree is assigned for packet data services (e.g., nodes 3, 6, 7, 12, 13, 14, 15, and 24–31). For higher data rates, requiring lower spreading factors, fewer codes are available. Thus, as shown in FIG. 2, at the highest data rate (utilizing code 1, and a spreading factor of 8) only a single channel (code) is available for utilization. As the spreading factors increase, and the data rates decrease, and as such more channels become available such that at a spreading factor of 128, 16 channels become available for utilization.

Varying a user's spreading code allows for data transmission rates to vary accordingly, decreasing system interference. Additionally varying a user's spreading code allows for many users to share the limited channels available by assigning a code to a user for a limited time and bursting data to the user. After an amount data has been transmitted to the user, the particular code then can be reassigned to another user for data transmission. As an example, in a first frame transmitted from base station 100, a first user may be assigned code 6, a second packet user code 14, and a third packet user code 31, while in the next frame transmitted from base station 100 the first user is assigned code 24, the second packet user is assigned code 13, while the code assigned to the third user remains unchanged.

Figure 3:
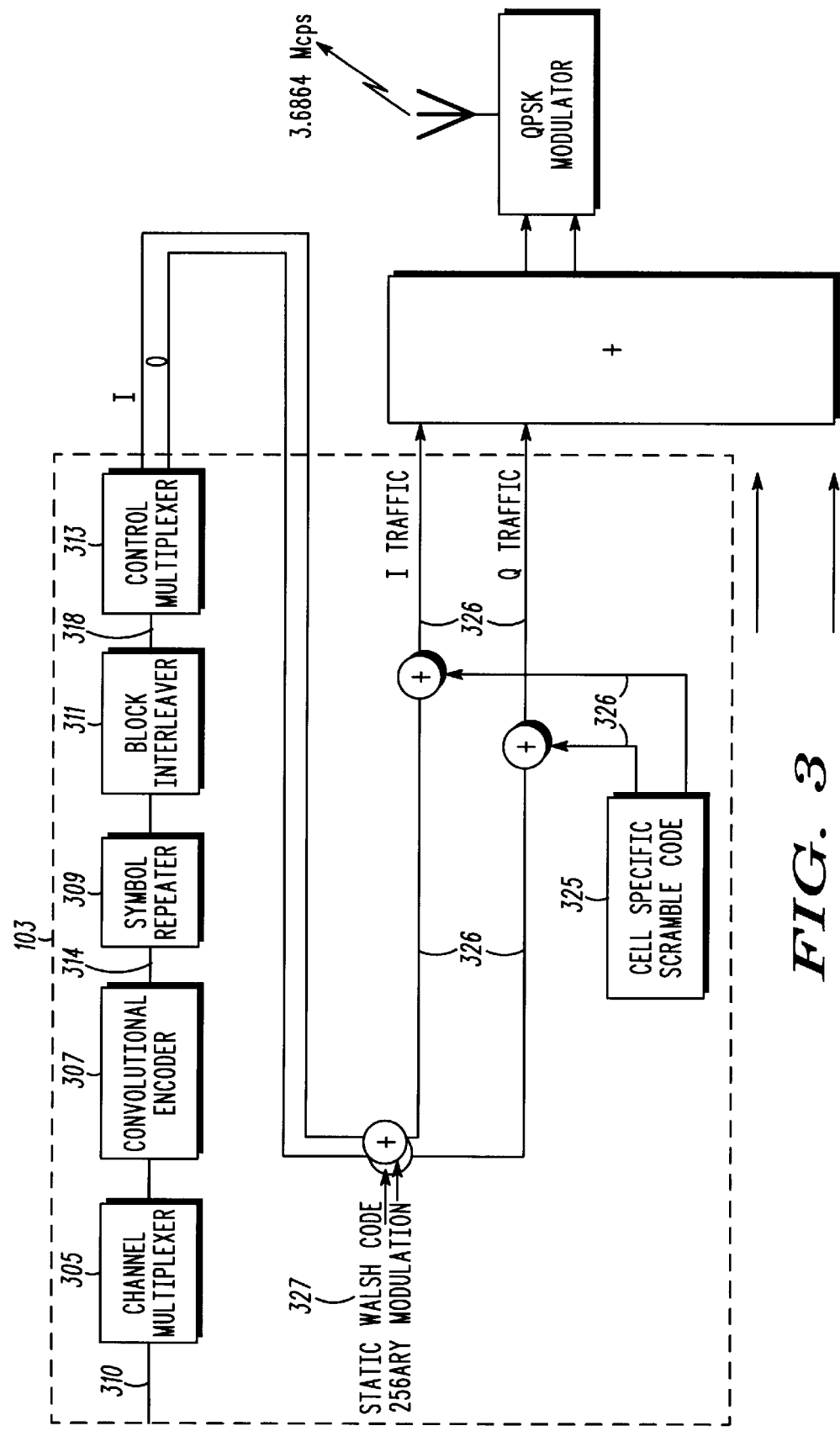
FIG. 3 is a block diagram of a code assignment channel of FIG. 1 for assigning a proper orthogonal code to a remote unit in accordance with the preferred embodiment of the present invention.

FIG. 3 is a block diagram of code assignment channel of FIG. 1 for assigning a proper orthogonal code to a remote unit in accordance with the preferred embodiment of the present invention. Code assignment channel 103 includes channel multiplexer 305, convolutional encoder 307, symbol repeater 309, block interleaver 311, control multiplexer 313, orthogonal encoder 327, and scrambler 325. During operation, data 310 is received by channel multiplexer 305 at a particular bit rate. Data bits 310 include remote unit ID information and a particular OVSF code assignment for the remote unit. An example of data bits 310 is illustrated in table 1.

TABLE 1

Downlink remote unit OVSF assignment transmitted by code assignment channel.

| Field | Bits | Reference |
| --- | --- | --- |
| ID | 6 | A 6-bit temporary ID providing equivalent resolution as GPRS (Slot+USF <=> 3 + 3) used to identify an allocation. |
| OVSF Code Assignment | 7 | Assigns a specific branch of the code tree. |

Channel multiplexer 305 multiplexes data, and/or control and signaling traffic onto the data 310 and outputs the multiplexed data to convolutional encoder 307. Convolutional encoder 307 encodes input data bits 310 into data symbols at a fixed encoding rate with an encoding algorithm which facilitates subsequent maximum likelihood decoding of the data symbols into data bits (e.g. convolutional or block coding algorithms). For example, convolutional encoder 307 encodes input data bits 310 at a fixed encoding rate of one data bit to two data symbols (i.e., rate ⅓) such that convolutional encoder 307 outputs data symbols 314 at a 32 ksymbol/second rate. At 32 ksymbol/second, using rate ⅓ encoding, 6 remote unit OVSF assignments can be made per 10 millisecond frame.

Data symbols 314 are then repeated by repeater 309 and input into interleaver 311. Interleaver 311 interleaves the input data symbols 314 at the symbol level. In interleaver 311, data symbols 314 are individually input into a matrix which defines a predetermined size block of data symbols 314. Data symbols 314 are input into locations within a matrix so that the matrix is filled in a column by column manner. Data symbols 314 are individually output from locations within the matrix so that the matrix is emptied in a row by row manner. Typically, the matrix is a square matrix having a number of rows equal to the number of columns; however, other matrix forms can be chosen to increase the output interleaving distance between the consecutively input non-interleaved data symbols. Interleaved data symbols 318 are output by interleaver 311 at the same data symbol rate that they were input (e.g., 32 ksymbol/second). The predetermined size of the block of data symbols defined by the matrix is derived from the maximum number of data symbols which can be transmitted at a predetermined symbol rate within a predetermined length transmission block.

Interleaved data symbols 318 have control information added and are passed to orthogonal encoder 327. Orthogonal encoder 327 modulo 2 adds a fixed, non-varying orthogonal code having a first length (e.g., a 256-ary Walsh code) to each interleaved and scrambled data symbol 318. For example, in 256-ary orthogonal encoding, interleaved and scrambled data symbols 318 are each exclusive OR'd by a 256 symbol orthogonal code. These 256 orthogonal codes preferably correspond to Walsh codes from a 256 by 256 Hadamard matrix wherein a Walsh code is a single row or column of the matrix. Orthogonal encoder 327 repetitively outputs a Walsh code which corresponds to input data symbol 318 at a fixed symbol rate.

Sequence of Walsh codes 342 are output to a mixer (not shown) where they are gain controlled. In the preferred embodiment of the present invention Walsh codes 342 are amplified by a fixed, non-varying amount. The power adjusted sequence of Walsh codes are then further spread by a pair of cell-specific scrambling codes 324 to generate an I-channel and Q-channel code spread sequence 326. The I-channel and Q-channel code spread sequences 326 are used to bi-phase modulate a quadrature pair of sinusoids by driving the power level controls of the pair of sinusoids. The sinusoids output signals are summed, QPSK modulated (by modulator 115) and radiated by antenna to complete transmission of channel data bits 310. In the preferred embodiment of the present invention, spread sequences 326 are output at a rate of 4.096 Mega Chips per second (Mcps) and radiated within a 5 MHz bandwidth, but in alternate embodiments of the present invention, spread sequences 326 may be output at a different rate and radiated within a different bandwidth.

Figure 4:
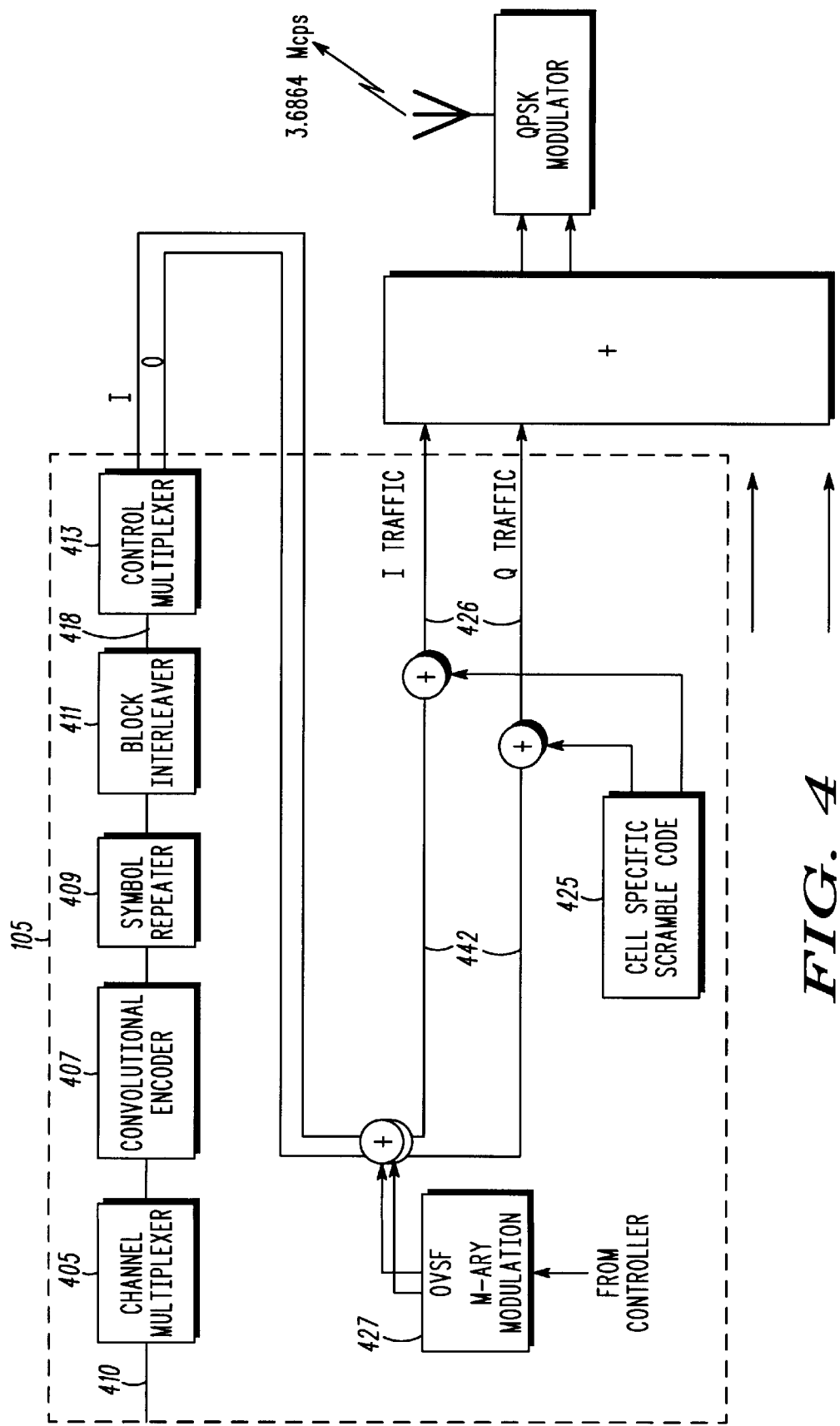
FIG. 4 is a block diagram of a dedicated data channel of FIG. 1 for transmitting data in accordance with the preferred embodiment of the present invention.

FIG. 4 is a block diagram of dedicated data channel circuitry 105 of FIG. 1 for transmitting data in accordance with the preferred embodiment of the present invention. Dedicated data channel circuitry 105 includes channel multiplexer 405, convolutional encoder 407, symbol repeater 409, block interleaver 411, control multiplexer 413, gain computer 415, orthogonal encoder 427, and scrambler 425. Operation of dedicated data channel circuitry 105 occurs in a similar manner as traffic channel circuitry 103 except that orthogonal encoder 427 modulo 2 adds an orthogonal code having a variable length (e.g., a length-M Walsh code) to each interleaved and scrambled data symbol 418. These M-length orthogonal codes preferably correspond to Walsh codes from a M by M Hadamard matrix wherein a Walsh code is a single row or column of the matrix. In both embodiments of the present invention orthogonal encoder 427 is instructed by controller 101 as to what particular orthogonal code to utilize. For example, in the preferred embodiment of the present invention remote units having large amounts of data to transmit can be assigned a first length Walsh code (e.g., length 16) while remote units having small amounts of data to transmit can be assigned a second length Walsh code (e.g., length 128). In the alternate embodiment of the present invention, during time periods of little interference a Walsh code having a first length (e.g., length 32) may be utilized, however, if code assignment circuitry 102 detects a rise in interference, a Walsh code having a second length (e.g., length 128) may be utilized. As discussed above, orthogonal encoder 427 can change Walsh codes at the frame rate, allowing for consecutive frames transmitted to a particular remote unit to have differing OVSF codes (Walsh codes), where the OVSF code utilized is based on an interference level.

Varying a user's spreading code allows for data transmission rates to vary accordingly, decreasing system interference. Additionally varying a user's spreading code allows for many users to share the limited channels available by assigning a code to a user for a limited time and bursting data to the user over that period of time. After an amount data has been transmitted to the user, the particular code then can be reassigned to another user for data transmission.

Figure 5:
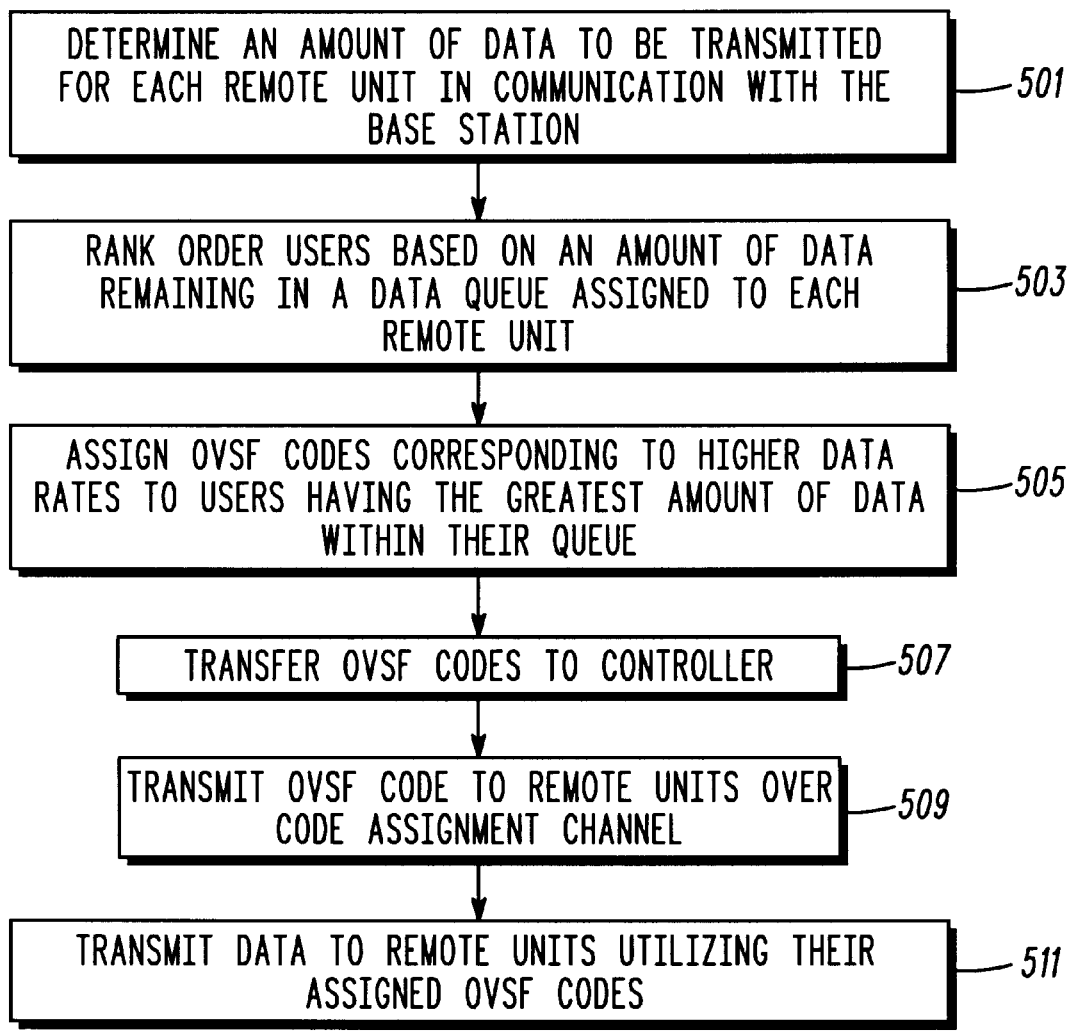
FIG. 5 is a flow chart illustrating operation of the base station of FIG. 1 in accordance with the preferred embodiment of the present invention.

FIG. 5 is a flow chart illustrating operation of base station 100 in accordance with the preferred embodiment of the present invention. In the preferred embodiment of the present invention a users OVSF code is periodically changed at a frame rate. Although many advantages can be envisioned for changing a users OVSF code at a frame rate (e.g., more data users than OVSF codes available, reducing system interference, lowering an individual users transmission rate based on an amount of data to be transmitted to a user, . . . , etc.) in the preferred embodiment of the present invention a user's code is changed based on an amount of data that is to be transmitted to a particular user. For example, a substantial amount of data may need to be transmitted to a first user, with very little data needed to be transmitted to a second user. In the preferred embodiment of the present invention users with a substantial amount data to be transmitted will be assigned an OVSF code corresponding to a higher data rate than users with little data needed to be transmitted.

The logic flow begins at step 501 where code assignment block 102 determines an amount of data to be transmitted for each remote unit 113 in communication with base station 100. In the preferred embodiment of the present invention this is accomplished by determining an amount of data remaining in a data queue assigned to each remote unit 113. Next, at step 503 all user's having queued data are rank ordered based on an amount of data within each user's queue. At step 505 OVSF codes corresponding to higher data rates are assigned to users having the greatest amount of data within their queue. For example, base station 100 may be communicating with four remote units 113, each having a differing amount of data within their queues. If the first and second remote unit have very little data to be transmitted, they may be assigned codes with a spreading factor corresponding to a lower data rate (e.g., codes 24 and 25 of FIG. 2). If the third remote unit has more data to be transmitted than the first two remote units, and has less data to be transmitted than the fourth remote unit, the third remote unit will be assigned a code (e.g., code 13 of FIG. 2) corresponding to an intermediate data rate and the fourth remote unit will be assigned a code (e.g., code 7 of FIG. 2) corresponding to the highest data rate available. Thus in the preferred embodiment of the present invention an OVSF code assigned to a particular remote unit has a length that is based upon an amount of data to be transmitted to the remote unit. It should be noted that in the preferred embodiment of the present invention OVSF code assignment is made on a frame-by-frame bases. In other words, for every frame that is transmitted from base station 100, a differing OVSF code may be assigned as described above. Therefore, in accordance with the preferred embodiment of the present invention a first and a second OVSF code may be utilized by a first and a second remote unit during a first frame, while in the very next frame, a third and a fourth OVSF code may be utilized by the first and the second remote unit. Additionally, the OVSF codes assigned to each remote unit are transmitted to the remote units as described above with reference to FIG. 3.

At step 507 the OVSF codes and corresponding remote unit identification information is transferred to controller 101. Controller 101 transmits this information to remote units over code assignment channel 104 (step 509). Finally at step 511, data is transmitted to the individual remote units utilizing their assigned OVSF codes.

Figure 6:
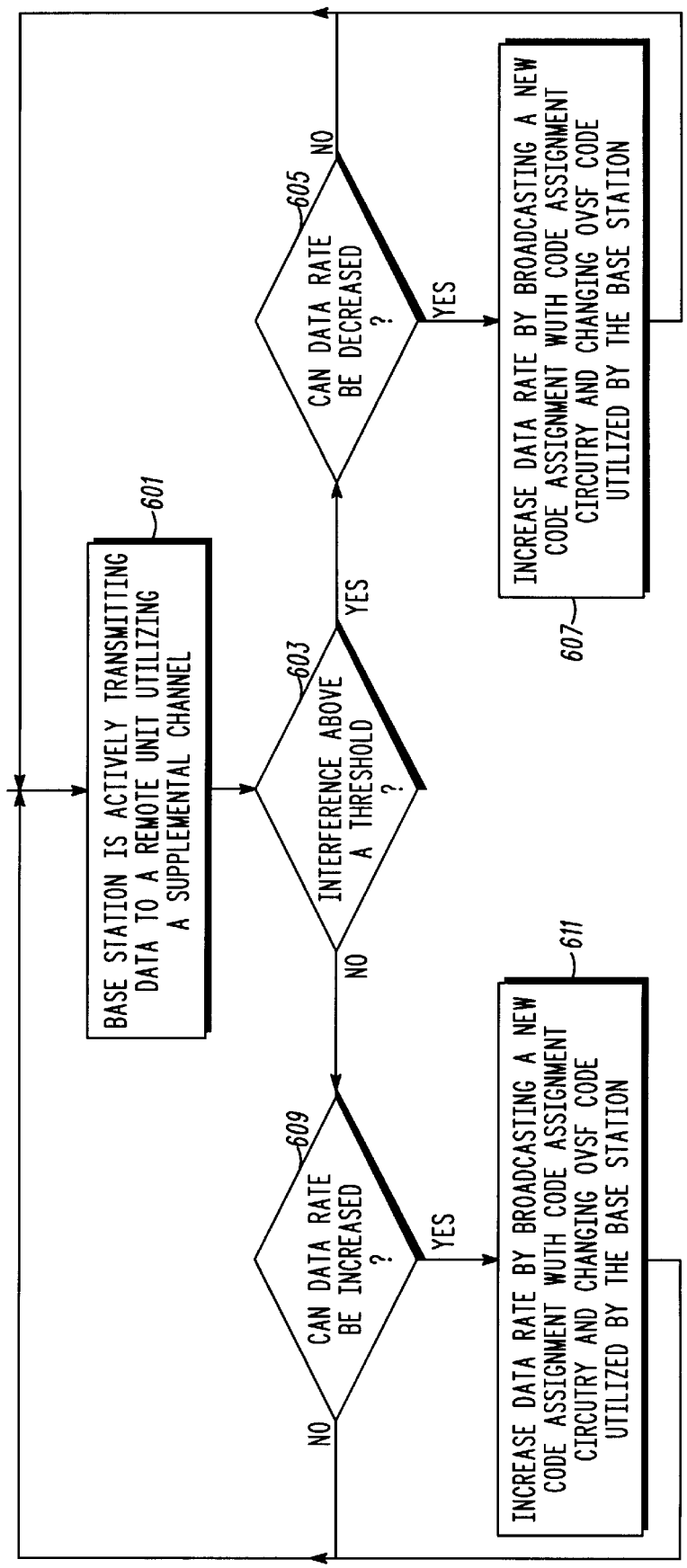
FIG. 6 is a flow chart illustrating operation of the base station of FIG. 1 in accordance with an alternate embodiment of the present invention.

FIG. 6 is a flow chart illustrating operation of base station 100 in accordance with an alternate embodiment of the present invention. The logic flow begins at step 601 where base station 100 is actively transmitting data to remote unit 113 utilizing dedicated data channel circuitry 105. At step 603 code assignment circuitry 102 determines if system interference is above a threshold. The interference level is detected at remote unit 113 and is a function of the energy per chip per received interference detected (Ec/Io). The Ec/Io is detected by remote unit 113 and is communicated to base station 100 via a dedicated or random access channel as part of standard messaging within a UMTS Wideband CDMA system.

Continuing, if at step 603 it is determined that system interference is above a threshold, then the logic flow continues to step 605 where it is determined if the data transmission rate can be further decreased. If at step 605 it is determined that the data transmission rate can be decreased, then the logic flow continues to step 607 where the data transmission rate is decreased, otherwise the logic flow returns to step 601. In the preferred embodiment of the present invention the data transmission rate is decreased by simultaneously broadcasting a new code assignment with code assignment channel 104, and changing the current OVSF code utilized by orthogonal encoder 427. For example, if orthogonal encoder 427 was utilizing a length 16 orthogonal code (corresponding to 256 ksymbols/sec) the symbol rate could be lowered to 32 ksymbols/sec by changing the OVSF code to a 128 length OVSF code. The logic flow then returns to step 601.

Returning to step 603, if at step 603 it is determined that system interference is not above the threshold, then the logic flow continues to step 609 where it is determined if the data transmission rate can be increased. If at step 609 it is determined that the data transmission rate can be increased, then the logic flow continues to step 611 where the data transmission rate is increased, otherwise the logic flow returns to step 601. In the preferred embodiment of the present invention the data transmission rate is increased by simultaneously broadcasting a new code assignment with code assignment channel 104, and changing the current OVSF code utilized by orthogonal encoder 427. For example, if orthogonal encoder 427 was utilizing a length 128 OVSF code (corresponding to 32 ksymbols/sec), the symbol rate could be increased to 256 ksymbols/sec by changing the OVSF code to a length 16 orthogonal code. The logic flow then returns to step 601.

In the preferred and alternate embodiments of the present invention, multiple remote units may be transmitting data to a single base station using consecutive frames. As such, two different remote units may be assigned a high rate spreading factor as described above (which may or may not be an OVSF code) for use in consecutive frames. Typically, the largest cell in a communication system has a maximum radius of around 10 miles (16 kilometers), which results in a round trip propagation delay around 100 micro seconds. Thus, if two remote units are located approximately 10 miles (16 kilometers) apart, the last part of transmission from one remote unit may overlap the transmission from the first part of the second remote unit for approximately 1/66 of the frame.

Figure 7:
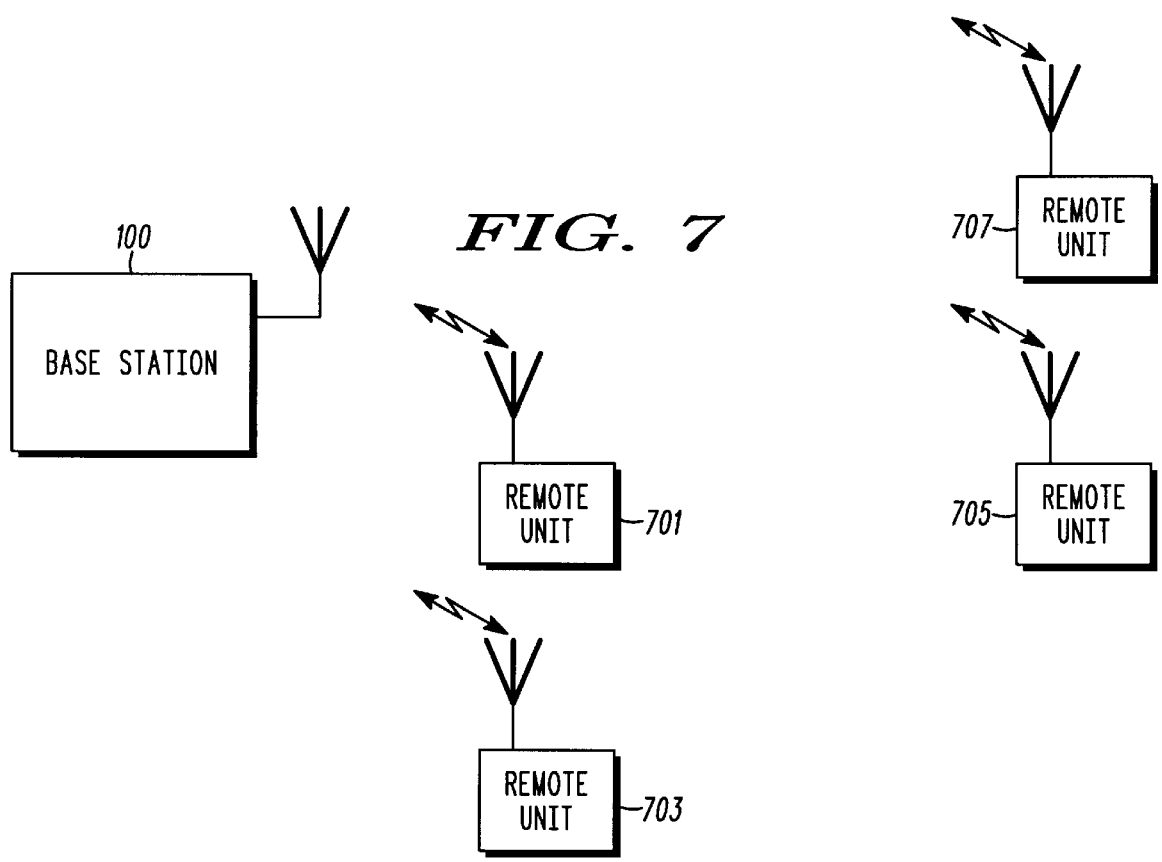
FIG. 7 is a block diagram of a communication system showing remote units at various distances from a base station.

FIG. 7 is a block diagram of a communication system showing remote units at various distances from a base station. As shown, remote units 701–703 are considerably closer to base station 100 than remote units 707–705. If remote units 701–703 transmit data in frames consecutive to remote units 705–707, the last part of transmission from close-in remote units 701–703 may overlap the transmission from the first part of far remote units 705–707. This is illustrated in FIG. 8. As shown in FIG. 8, transmission from four remote units 701–707 are received by base station 100. (Frame boundaries for a zero round-trip delay (absolute frame boundaries) are shown in FIG.8 for illustration.) As is evident, transmission from all remote units 701–707 (illustrated as frames 801–807) are offset in time from the absolute frame boundaries. When close-in remote units (e.g. remote units 701–703) transmit in frames following the transmission of far remote units, a collision may occur. This is shown in FIG. 8 as frame overlap 809. In other words, the transmission from remote unit 705 (shown as frame 805) partially overlaps frame 803 transmitted from remote unit 703.

In order to prevent frames from far remote units from overlapping frames from close remote units transmissions from close remote units will be retarded in time when following a frame transmitted from a far remote unit. This process is illustrated in FIG. 9.

Figure 9:
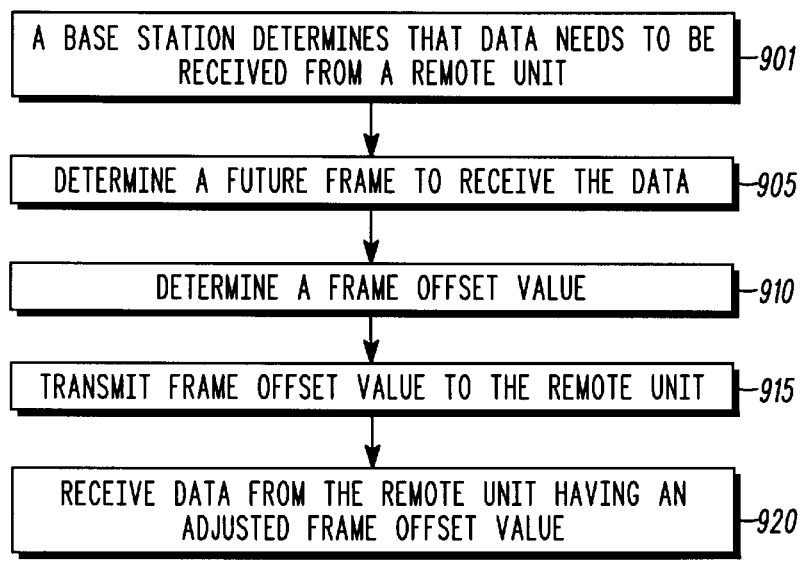
FIG. 9 is flow chart illustrating operation of the base station of FIG. 7 in accordance with a second alternate embodiment of the present invention.

FIG. 9 is flow chart illustrating operation of the base station of FIG. 7 in accordance with a second alternate embodiment of the present invention. The logic flow begins at step 901 where base station 100 determines that data needs to be received from a remote unit. Next, at step 905, base station 100 determines a future frame to receive data from the remote unit. This is accomplished as described above with reference to FIG. 5. At step 910 a frame offset value (Δt) is determined for the transmission. In the alternate embodiment of the present invention, the frame offset value is an amount of time that the remote unit will retard its transmission by when transmitting to base station 100.

In the alternate embodiment of the present invention two differing methods for determining Δt are envisioned. In a first method the frame offset is based on a distance between a single remote unit and the base station and in the second method, the frame offset is based on a relative distance between the first and the second remote unit. In the first method, Δt is set equal to a time period (η) that the frame currently being received is offset from the absolute frame boundary. In other words, controller 101 determines a frame boundary for a remote unit having no round-trip delay, and determines difference in time (η) between the frame boundary and the time that the remote unit began its data transmission. It should be noted that η is directly proportional to a range between the remote unit and the base station. This is illustrated in FIG. 10.

In a second method prior transmissions from a remote unit that is to transmit in the next frame are analyzed to determine a time period (γ) that the next frame to be received was offset from the absolute frame boundary during its last transmission. Δt is set equal to η−γ. Thus, in the second method Δt is directly proportional to a difference in range, with respect to the base station, between the remote unit that is to transmit in the next frame and the remote unit that is transmitting in the current frame. This is illustrated in FIG. 11.

Continuing, at step 915 Δt is transmitted to a remote unit that is to transmit during the next time period. In particular the code assignment channel is utilized to transmit Δt to the remote unit that is to transmit on the next frame, however in alternate embodiments of the present invention, any method may be utilized to transmit Δt to the remote unit. Finally, at step 920, data is received from a remote unit having an adjusted frame offset value equal to Δt.

The descriptions of the invention, the specific details, and the drawings mentioned above, are not meant to limit the scope of the present invention. For example, although the preferred and alternate embodiments of the present invention were described above as it relates to changing downlink OVSF codes, one of ordinary skill in the art will recognize that uplink OVSF codes may be changed in a similar manner without varying from the scope of the present invention. In this case both downlink and uplink OVSF codes may be assigned by utilizing the same code assignment channel 104. It is the intent of the inventors that various modifications can be made to the present invention without varying from the spirit and scope of the invention, and it is intended that all such modifications come within the scope of the following claims and their equivalents.

What is claimed is:

1. A method for data transmission within a spread spectrum communication system, the method comprising the steps of:

determining that data needs to be received from a first remote unit;

determining a future frame for receiving the data from the first remote unit;

determining a time offset for the frame such that data received with the time offset will avoid colliding with data transmitted from a second remote unit during a prior frame wherein the time offset is directly proportional to a difference in range unit with respect to a base station between the first remote unit and the second remote unit;

transmitting the time offset to the first remote unit; and receiving data from the first remote unit during the future frame, wherein the data is received at an adjusted time period equal to the time offset.

2. The method of claim 1 wherein the step of transmitting the time offset to the remote units comprises the step of transmitting the time offset to the remote units via a common code assignment channel.

3. A method for data transmission within a spread spectrum communication system, the method comprising the steps of:

determining that data needs to be received from a first remote unit;

determining a future frame for receiving the data from the first remote unit;

determining a difference in time between a current frame boundary and a time period that a second remote unit began its transmission;

transmitting the difference in time to the first remote unit; and receiving data from the first remote unit during the future frame, wherein the data is received at an adjusted time period equal to the difference in time.

* * * * *